April 14, 1925.

F. H. POEPPELMEIER

PRINTER'S CHASE

Filed April 16, 1923

1,533,462

INVENTOR.
FRANK H. POEPPELMEIER.

Patented Apr. 14, 1925.

1,533,462

UNITED STATES PATENT OFFICE.

FRANK H. POEPPELMEIER, OF DAYTON, OHIO, ASSIGNOR TO THE HAAS LETTER SERVICE COMPANY, OF DAYTON, OHIO, A CORPORATION OF OHIO.

PRINTER'S CHASE.

Application filed April 16, 1923. Serial No. 632,394.

*To all whom it may concern:*

Be it known that I, FRANK H. POEPPELMEIER, a citizen of the United States, residing at Dayton, in the county of Montgomery and State of Ohio, have invented certain new and useful Improvements in Printers' Chases, of which the following is a specification, reference being had therein to the accompanying drawing.

This invention relates to a printer's chase and more particularly to a chase having slots or grooves into which the individual type may be inserted, by a machine or otherwise, to constitute a form.

One object of the invention is to provide a chase which can be manufactured at a low cost and which will be rigid in construction and of a strong durable character.

A further object of the invention is to produce such a chase from sheet metal.

Other objects of the invention will appear as the device is described in detail.

Figure 1:
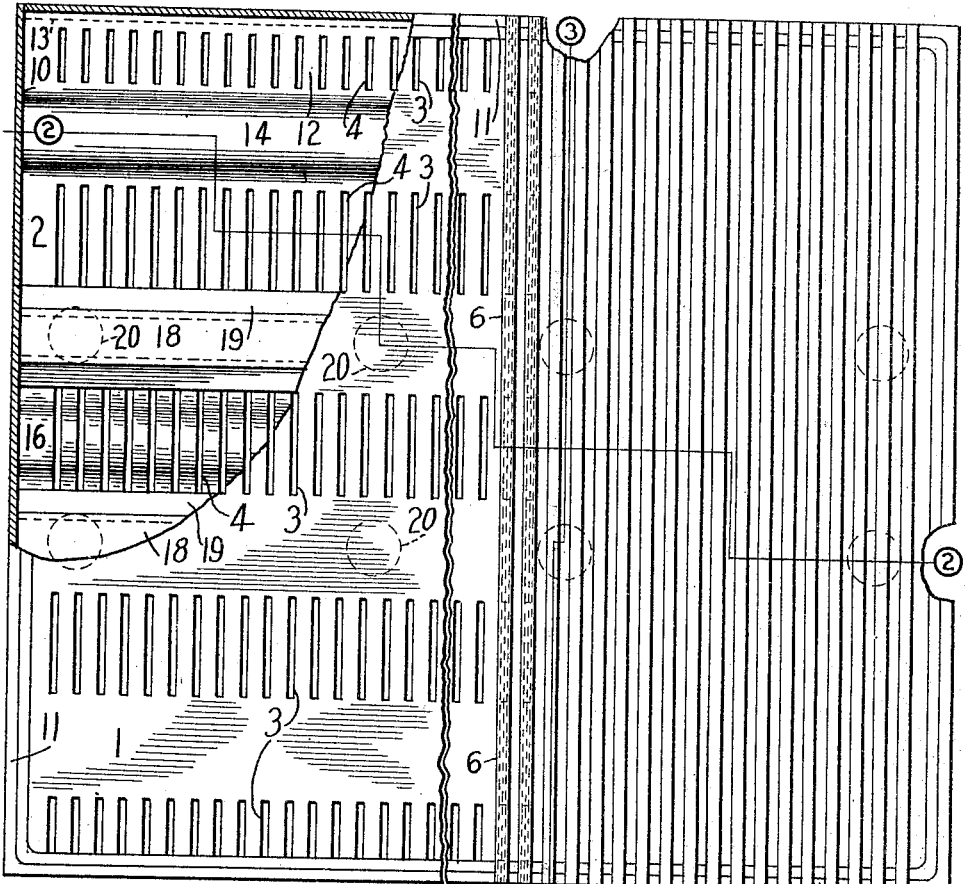
Figure 2:
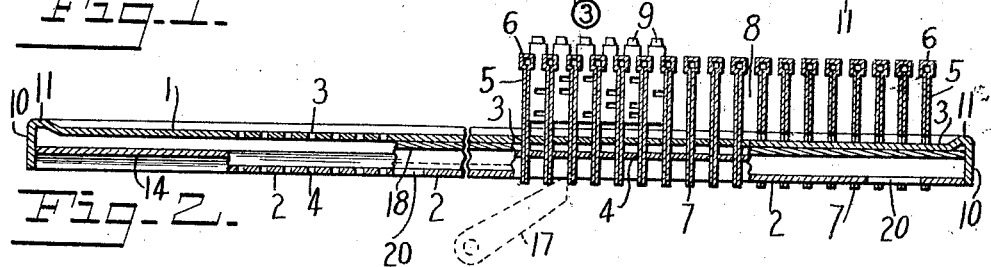
Figure 3:
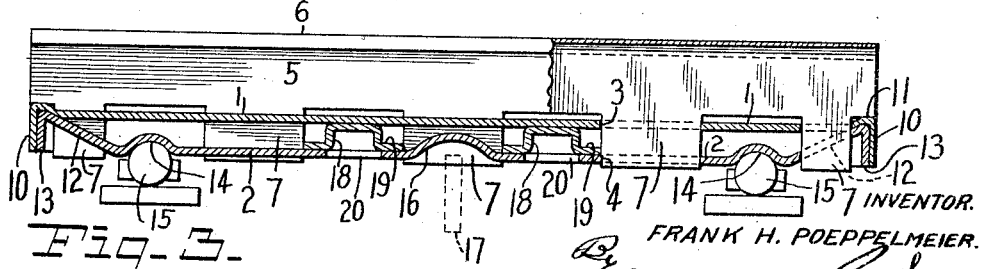

In the accompanying drawings Fig. 1 is a plan view, partly broken away, of a chase embodying my invention; Fig. 2 is a section taken on the line 2—2 of Fig. 1; and Fig. 3 is a section taken on the line 3—3 of Fig. 1.

In these drawings I have illustrated one embodiment of my invention and have shown the same as designed more particularly for use with a type setting machine operated by a typewriter, as shown in Patent No. 1,032,564, granted July 16, 1912 to William J. Poole. I have also shown the chase as formed wholly of sheet metal but it will be understood that the present embodiment has been chosen for the purpose of illustration only and that the type may be set in the chase in any suitable manner and that the chase itself may take various forms without departing from the spirit of the invention.

In that form of the chase here shown, it comprises a base portion formed of an upper or top plate 1 and a lower bottom plate 2, which plates are substantially parallel and are spaced apart and rigidly connected one to the other. Both the upper and lower plates are provided with a plurality of series of slots, 3 and 4, the several series of slots being substantially parallel and the slots being of an elongated shape extending transversely to the length of the chase. The corresponding slots in the upper and lower plates, 1 and 2, are mounted one above the other, preferably in true vertical alinement, and the corresponding slots of the several series, in each plate, are arranged in longitudinal alinement. Mounted on the base is a series of bars or ribs 5, each having at its upper edge an enlarged portion or head 6, so that the bar as a whole has substantially a T shape in cross section. Each bar is provided with depending portions or lugs 7 extending through the corresponding longitudinally alined openings 3 and 4 in the upper and lower plates so that the several bars may be supported in upright positions and spaced apart to form between them slots or grooves 8 adapted to receive type 9, the type having, in their lateral edges, notches to receive the T shaped heads of adjacent bars and thus cause the type to be supported with their printing faces in a common plane.

The upper and lower portions of the base may be of any suitable character and may be formed in any suitable manner, but the present construction has been so designed that the parts can be formed of sheet metal, thus enabling the chase to be produced by punches and dies. As here shown, the upper portion or plate 1 of the base is provided along its several edges with vertical flanges 10 which provide a convenient means for securing the bottom plate 2 to the top plate and also impart a greater rigidity to the top plate. The inner portion of the top plate 1 is also shown as depressed into a plane below the plane of the outer edges thereof, so that the slotted portions of the top plate are surrounded by a raised portion or shoulder 11 upon which, in the present instance, the ends of the several bars 5 rest. The lower plate 2 is arranged substantially parallel with the plate 1 and fits within the depending flanges 10 of the upper plate. As here shown, the lateral portions of the lower plate are bent upwardly, as shown at 12, and have their outer edge portions bent downwardly to form flanges 13. The angles formed by the inclined portions 12 and the flanges 13 extend into the channels formed in the higher edge portions or shoulders 11 of the upper plate, thus providing a snug fit of the parts and accurately positioning the slots in the respective plates with relation one to the other. The bottom plate 2 may also be provided, in the lateral portions thereof, with longitudinally extending channels or grooves 14, which, in the present instance, are arranged adjacent to the inner edges of the inclined parts. These longitudinally extending grooves constitute ball races and are adapted to receive bearing balls 15 upon which the base is supported for movement to bring the successive grooves 8 into alinement with the type inserting mechanism. The bottom plate 2 is also provided with another longitudinal channel or groove, 16, arranged between the ball races 14, and one series of slots 4 are formed in the base of this groove, as shown in Figs. 1 and 3, so that the lugs 7 of the plates 5 which extend through the slots of this particular series of slots, will project below the lower surface of the plate 2 and will constitute teeth which, in the aggregate, form a longitudinal rack adapted to be engaged by a pawl 17, or other suitable actuating device, as shown diagrammatically in Fig. 2, for the purpose of advancing the chase step by step as the successive grooves 8 are filled with type. In this manner I avoid the necessity of providing a separately formed rack which would add materially to the expense of construction. I also prefer to interpose between the top plate 1 and the bottom plate 2, suitable spacing members which will rigidly maintain the two plates in their proper spaced relation. As here shown, these spacing members are in the form of longitudinally extending bars 18, U-shaped in cross section and provided at their open edges with laterally extending flanges 19. The flanges 19 rest upon the bottom plate 2 and may be rigidly secured thereto in any suitable manner, as by welding. The upper portions of the bars are secured to the top plate 1 and in order that this connection may be made by spot welding, if desired, I have provided the bottom plate 2 with a series of openings 20 spaced apart along the spacing members 18 to permit the insertion of the welding implement.

The bars 5 are also preferably formed from sheet metal and, as here shown, each bar is formed from a blank of metal bent upon itself so that each bar consists of two parallel portions, which are spaced apart at the upper portion of the bar to form the head 6. These bars are preferably formed by suitable dies to cause the heads 6 to be formed of uniform size and shape. When the base has been assembled the several bars are placed in position thereon by inserting the lugs 7 through the respective slots in the top and bottom plate of the base. Inasmuch as the plates are spaced apart and the lugs extend through both plates, and fit snugly in the slots, it will be apparent that the bars will be held rigidly in their vertical positions, as well as in proper spaced relation one to the other. The bars may be secured within the slots in any suitable manner as by brazing and, if desired, the completely assembled chase may be dipped in molten metal.

It will be apparent from the foregoing description that I have provided a chase which can be produced at a very low cost, comprising but a few parts and these parts being of such a character that they can be formed from sheet metal by punches and dies, and can be quickly and easily assembled. The structure is, moreover, of a very strong durable character and is very rigid. It has all the essential characteristics of a chase machined from steel and it is of lighter weight. While I have herein shown and described the chase as comprising a flat substantially rectangular base it will be obvious that it may be made in any suitable form, such, for example, as cylindrical.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a device of the character described, a plate having therein a series of slots, bars mounted on said plate in spaced relation one to the other and each having a part extending through one of the slots in said plate, and means for supporting said bar rigidly in position on said plate.

2. In a device of the character described, a plate having a plurality of series of slots, the corresponding slots of the several series being in longitudinal alinement, a plurality of bars mounted on said plate and each having parts extending through alined slots in said plate, and means to hold said bars against tilting movement in said slots.

3. In a device of the character described, a plate having a plurality of series of slots, the corresponding slots of the several series being in longitudinal alinement, a plurality of bars mounted on said plate and each having parts extending through alined slots in said plate, and means arranged beneath said plate to hold said bars against tilting movement in said slots.

4. In a device of the character described, a top plate having means to support the same in an elevated position and having a series of slots therein, a plurality of bars mounted on said top plate and each having a part extending through one of said slots, and means arranged beneath said top plate to hold said bars against tilting movement in said slots.

5. In a device of the character described, a plate having a plurality of series of slots, the corresponding slots of the several series being in longitudinal alinement, a plurality of bars each formed from a blank of sheet metal bent upon itself and having its upper edge enlarged to form a head, each of said bars having a part extending through one of the slots of said plate, and means to hold said bars against tilting movement in said slots.

6. In a device of the character described, a plate having downturned flanges along the edges thereof and having a plurality of series of slots, the corresponding slots of the several series being in longitudinal alinement, a plurality of bars supported above said plate and each having parts extending through alined slots in said plate, and means arranged beneath said plate and engaging said parts of said bars to hold the latter in fixed positions.

7. In a device of the character described, a top plate formed of sheet metal, having downturned flanges along the edges thereof and having a series of slots extending lengthwise thereof, the individual slots extending transversely to said plate, and a plurality of bars each formed from a blank of sheet metal bent upon itself and having its upper edge enlarged to form a head, each of said bars having a part extending through one of the slots in said top plate, and means to hold said bars against tilting movement in said slots.

8. In a device of the character described, a top plate formed of sheet metal, having downturned flanges along the edges thereof and having a series of slots extending lengthwise thereof, the individual slots extending transversely to said plate, said plate having its lateral edge portions raised above the slotted portion thereof, and a plurality of bars extending transversely to said plate resting at their ends upon the raised portions thereof and each having a part extending through one of said slots, and means for holding said bars against tilting movement in said slots.

9. In a device of the character described, a base comprising upper and lower portions each having a series of slots, the corresponding slots in the two portions being in alinement, and a plurality of bars mounted on said base and spaced apart to form slots between them, and each having a part extending through alined slots in the upper and lower portions of said base.

10. In a device of the character described, a base comprising two substantially parallel plates spaced apart and rigidly connected one to the other, each of said plates having a plurality of series of slots, the corresponding slots in the two plates being arranged one above the other and the corresponding slots in the several series being arranged in longitudinal alinement, and a plurality of bars mounted on said base, spaced apart to form slots between adjacent bars, and each having parts extending through alined slots in both of said plates.

11. In a device of the character described, a base comprising two substantially parallel plates spaced apart and rigidly connected one to the other, each of said plates having a plurality of series of slots, the corresponding slots in the two plates being arranged one above the other and the corresponding slots in the several series being arranged in longitudinal alinement one with the other, the upper plate having its lateral edges projecting above the intermediate slotted portion thereof, and a plurality of bars extending transversely to said base, having their end portions supported by the upwardly projecting lateral edges of said top plate and each having parts extending through alined slots in both plates.

12. In a device of the character described, a base comprising a top plate having its lateral edge portions turned downwardly to form flanges and having its intermediate portion depressed below the lateral portions thereof, whereby longitudinal channels are formed in the lower surface of said top plate along said flanges, said depressed portion of said top plate having a longitudinally extending series of transverse slots, a bottom plate arranged between the flanges of said top plate and having its lateral portions inclined upwardly and provided with downwardly extending flanges, the upper edges of said inclined portions and said flanges extending into the respective channels in said top plate, said bottom plate having a longitudinally extending series of transverse slots, the respective slots being arranged in vertical alinement with the corresponding slots in said top plate, and a series of bars extending transversely to said base, having their end portions supported on the lateral edges of said top plate, and each having a part extending through corresponding slots in both the top plate and the bottom plate.

13. In a device of the character described, a base comprising a top plate having a longitudinally extending series of transverse slots, a bottom plate arranged below said top plate and rigidly secured in spaced relation thereto, said bottom plate having in its lower surface a longitudinally extending channel arranged beneath the series of slots in said top plate, said channel being provided with transverse slots arranged in alinement with the corresponding slots in said top plate, and a plurality of transversely extending bars mounted on said top plate and each having a part extending through the corresponding slots in said top plate and said bottom plate, whereby said parts will project below the lower surface of the channel in the bottom plate and constitute rack teeth.

14. In a device of the character described, a base comprising a top plate and bottom plate, said plates being arranged one above the other and rigidly secured in spaced relation, each of said plates having a longitudinally extending series of transverse slots, the corresponding slots of the two series being in alinement one with the other, and a series of transverse bars mounted on said base and each having a part extending through the corresponding slots in the two plates and projecting below the lower surface of the bottom plate to form rack teeth.

15. In a device of the character described, a base comprising a top plate, a longitudinally extending series of transverse slots, a bottom plate arranged beneath said top plate and rigidly secured in spaced relation thereto, said bottom plate having a longitudinally extending series of transverse slots arranged in line with the corresponding slots in the top plate, said bottom plate also having longitudinally extending grooves in the lower surface thereof forming ball races, and a plurality of transverse bars mounted on said base, each having a part extending through corresponding slots in both plates.

16. In a device of the character described, a base comprising a top plate having a longitudinally extending series of transverse slots, a bottom plate arranged beneath said top plate and rigidly secured in spaced relation thereto, said bottom plate having in the lower surface thereof a plurality of longitudinally extending grooves, two of said grooves constituting ball races, and having a series of transverse slots formed in another of said grooves, said slots being arranged in alinement with the corresponding slots in the top plate, and a plurality of transverse bars mounted on said base and each having a part extending through alined slots in the two plates, and having their lower edges extending into the last mentioned groove.

17. In a device of the character described, a base comprising a top plate having a longitudinally extending series of transverse slots, a bottom plate arranged beneath said top plate and rigidly secured in spaced relation thereto, said bottom plate having in the lower surface thereof a plurality of longitudinally extending grooves, two of said grooves constituting ball races, and having a series of transverse slots formed in another of said grooves, said slots being arranged in alinement with the corresponding slots in the top plate, spacing members arranged between said top plate and said bottom plate on opposite sides of the last mentioned groove, and a plurality of transverse bars mounted on said base and each having a part extending through alined slots in the two plates and having its lower edge extending into said slotted groove.

18. In a device of the character described, a base comprising a substantially rectangular top plate having its several edge portions turned downwardly to form flanges and having a plurality of parallel series of transverse slots extending lengthwise thereof, a bottom plate mounted between the flanges on said top plate and rigidly secured in spaced relation to said top plate, said bottom plate having a corresponding plurality of parallel series of transverse slots extending lengthwise thereof, the slots of each series being arranged in vertical alinement with the corresponding slots in the top plate and the corresponding slots of the several series in each plate being arranged in longitudinal alinement one with the other, and a series of transverse bars mounted on said base and each having parts extending through corresponding alined slots in both of said plates.

19. In a type chase, a plate, a plurality of bars each formed from a blank of sheet metal bent upon itself and having its upper edge enlarged to form a head, said plate and said bars having cooperating parts to secure said bars in fixed parallel positions on said plate.

20. In a type chase, a bar comprising a blank of sheet metal bent upon itself and having those portions adjacent to the connected edges of the two parts of said bar spaced apart to form an enlarged head extending lengthwise of said bar.

In testimony whereof, I affix my signature hereto.

FRANK H. POEPPELMEIER.